United States Patent
Kundmann et al.

(10) Patent No.: US 12,003,269 B2
(45) Date of Patent: *Jun. 4, 2024

(54) SCALABLE DIVERSITY DEPLOYMENT FOR WIDE TUNING RANGE TRANSCEIVER

(71) Applicant: Shure Acquisition Holdings, Inc., Niles, IL (US)

(72) Inventors: Thomas J. Kundmann, Oakwood Hills, IL (US); Michael J. Goodson, Union, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,541

(22) Filed: Apr. 11, 2022

(65) Prior Publication Data

US 2023/0086650 A1 Mar. 23, 2023

Related U.S. Application Data

(63) Continuation of application No. 17/187,249, filed on Feb. 26, 2021, now Pat. No. 11,303,317, which is a
(Continued)

(51) Int. Cl.
*H04W 24/02* (2009.01)
*H04B 1/00* (2006.01)
(Continued)

(52) U.S. Cl.
CPC ............. *H04B 1/401* (2013.01); *H04B 1/005* (2013.01)

(58) Field of Classification Search
None
See application file for complete search history.

(56) References Cited

U.S. PATENT DOCUMENTS

| 6,396,821 B1 | 5/2002 | Takahashi |
| 7,957,351 B2 | 6/2011 | Casaccia |

(Continued)

FOREIGN PATENT DOCUMENTS

| CN | 1960200 | 5/2007 |
| CN | 102047581 | 5/2011 |

(Continued)

OTHER PUBLICATIONS

International Search Report and Written Opinion for PCT/US2020/034947 dated Oct. 15, 2020, 11 pp.
(Continued)

*Primary Examiner* — Pablo N Tran
(74) *Attorney, Agent, or Firm* — Banner & Witcoff, Ltd.

(57) ABSTRACT

A wireless communication system with scalable diversity and multi-transceiver diversity deployment is disclosed. An example communication system includes a first wireless transceiver, having a first bandwidth and a first center frequency, a second transceiver, having a second bandwidth and a second center frequency, and a processor. The processor is configured to operate the wireless communication system in a first mode when a difference between the first center frequency and the second center frequency is greater than or equal to half of the first bandwidth plus the second bandwidth. The processor is also configured to operate the wireless communication system in a second mode when a difference between the first center frequency and the second center frequency is less than half of the first bandwidth plus the second bandwidth.

20 Claims, 4 Drawing Sheets

Related U.S. Application Data continuation of application No. 16/932,334, filed on Jul. 17, 2020, now abandoned, which is a continuation of application No. 16/426,513, filed on May 30, 2019, now Pat. No. 10,720,953.

(51) Int. Cl.
*H04B 1/401* (2015.01)
*H04B 1/74* (2006.01)
*H04B 7/12* (2006.01)
*H04W 48/16* (2009.01)

(56) References Cited

U.S. PATENT DOCUMENTS

| | | | |
|---|---|---|---|
| 8,031,622 B2 | 10/2011 | Padovani | |
| 8,457,264 B2 | 6/2013 | Girardeau, Jr. | |
| 8,688,172 B2 | 4/2014 | Beaudin | |
| 8,862,081 B2 | 10/2014 | Sutton | |
| 9,178,599 B2 | 11/2015 | Imao | |
| 9,461,766 B2 * | 10/2016 | Yi | H04L 27/2613 |
| 9,712,226 B2 | 7/2017 | Leung | |
| 9,848,340 B2 | 12/2017 | Kazmi | |
| 9,912,425 B2 | 3/2018 | Laaser | |
| 10,128,932 B2 | 11/2018 | Koifman | |
| 10,200,106 B1 | 2/2019 | Barzegar | |
| 10,306,638 B2 * | 5/2019 | Xue | H04L 5/0073 |
| 2008/0081603 A1 | 4/2008 | Cho | |
| 2011/0158339 A1 | 6/2011 | Tuttle | |
| 2013/0072135 A1 | 3/2013 | Banerjea | |
| 2017/0047904 A1 | 2/2017 | Szopko | |
| 2017/0289960 A1 * | 10/2017 | Moustafa | H04J 11/0069 |
| 2018/0063817 A1 | 3/2018 | Chakraborty | |
| 2018/0167103 A1 * | 6/2018 | Schwartz | H04L 1/0083 |
| 2018/0309528 A1 | 10/2018 | King | |
| 2021/0184824 A1 * | 6/2021 | Kwak | H04L 5/0094 |
| 2021/0258978 A1 * | 8/2021 | Wei | H04L 5/003 |

FOREIGN PATENT DOCUMENTS

| | | |
|---|---|---|
| CN | 103346813 | 10/2013 |
| CN | 104838601 | 8/2015 |
| CN | 109743737 | 5/2019 |
| EP | 2129064 | 12/2009 |
| GB | 2551433 | 12/2017 |
| JP | 2014072688 | 4/2014 |
| WO | 2009145710 | 12/2009 |

OTHER PUBLICATIONS

Shure Incorporated, "Multipath and Receiver Diversity," obtained from webpage <https://www.shure.com/en-US/support/find-an-answer/multipath-and-receiver-diversity>, Aug. 29, 2017, 10 pp.
Shure Incorporated, Axient® Digital, Integrity You Can Hear, Brochure, 2017, 10 pp.
Shure Incorporated, Shure Introduces Axient® Digital Wireless System, Press Release, Apr. 24, 2017, 6 pp.
Nov. 3, 2023—(EP) OA App—20760593.2.
Sep. 23, 2023—Office Action—App No. CN202080048980.6.

* cited by examiner

SCALABLE DIVERSITY DEPLOYMENT FOR WIDE TUNING RANGE TRANSCEIVER

CROSS-REFERENCE

This application is a is a continuation of U.S. patent application Ser. No. 17/187,249, filed on Feb. 26, 2021, which is a continuation of U.S. patent application Ser. No. 16/932,334, filed on Jul. 17, 2020, which is a continuation of U.S. patent application Ser. No. 16/426,513, now U.S. Pat. No. 10,720,953, filed on May 30, 2019. These applications are incorporated herein by reference in their entireties.

TECHNICAL FIELD

This application generally relates to a flexible multi-channel wireless communication system. In particular, this application relates to a multi-channel wireless audio transceiver system for routing, filtering, processing, and combining multiple radio frequency (RF) signals containing audio signals received on and transmitted by respective antennas.

BACKGROUND

Audio production can involve the use of many components, including microphones, wireless audio transmitters, wireless audio receivers, recorders, and/or mixers for capturing, recording, and presenting the sound of productions, such as television programs, newscasts, movies, live events, and other types of productions. The microphones typically capture the sound of the production, which is wirelessly transmitted from the microphones and/or the wireless audio transmitters to the wireless audio receivers. The wireless audio receivers can be connected to a recorder and/or a mixer for recording and/or mixing the sound by a crew member, such as a production sound mixer. Electronic devices, such as computers and smartphones, may be connected to the recorder and/or mixer to allow the crew member to monitor audio levels and timecodes.

Wireless audio transmitters, wireless audio receivers, wireless microphones, and other portable wireless communication devices include antennas for transmitting and receiving radio frequency (RF) signals which contain digital or analog signals, such as modulated audio signals, data signals, and/or control signals. Users of portable wireless communication devices include stage performers, singers, actors, news reporters, and the like.

A wireless audio transmitter may transmit an RF signal that includes an audio signal to a wireless audio receiver. The wireless audio transmitter may be included in a wireless handheld microphone or body pack, for example, that is held or worn by the user and includes an integrated transmitter and antenna. When the RF signal is received at the wireless audio receiver, the RF signal may be degraded due to multipath fading caused by constructive interference and/or by other types of interference. This degradation may cause the RF signal to have a poor signal-to-noise ratio (SNR), which can result in bit errors that can cause audio artifacts and muting of the resulting output audio. However, muting the output audio is undesirable in many situations and environments, such as during professional stage productions and concerts. The effects of such multipath fading and interference are most prevalent in harsh RF environments where physical and electrical factors influence the transmission and reception of RF signals, e.g., movement of the microphone within the environment, other RF signals, operation in large venues, etc.

To alleviate issues with multipath fading of RF signals, wireless audio components may utilize frequency diversity and/or antenna diversity techniques. In particular, wireless audio transmitters may utilize frequency diversity to simultaneously transmit on one antenna two RF signals of two separate frequencies in a combined RF signal, where the two RF signals both include the same audio signal. A wireless audio receiver may then use one or both of the underlying RF signals. In addition, wireless audio receivers may utilize antenna diversity to simultaneously receive RF signals from a wireless audio transmitter on multiple antennas. The received RF signals can be combined to produce a single audio output.

In some cases, a two antenna system may not be sufficient to provide adequate performance. More than two antennas may be desired in order to benefit from the use of antennas with different directional gains so that the coverage of the wireless system is extended. For example, a particular venue may have multiple "zones" that need to be covered by a single wireless receiver and/or a venue may be very large. In these situations, having more than two antenna locations may result in improved coverage and reduced transmitter to antenna distances. As such, a traditional two antenna diversity may not provide adequate performance.

When utilizing frequency diversity and/or antenna diversity techniques, existing wireless audio receivers typically combine multiple RF signals received on multiple antennas by scaling each RF signal proportionally using maximal-ratio combining (MRC) under the assumption that there is equal noise power in each RF signal. However, if the antennas are subjected to asymmetrical noise, e.g., when one antenna is closer to a source of interference, then MRC does not maximize the signal-to-noise ratio of the combined signal. This can cause the receiver to produce non-optimal audio output, such as degraded sound or muting. In addition, existing wireless audio receivers may need additional components and complex arrangements in certain situations and environments. For example, if more than two antennas are utilized, external antennas combiners and external switches may be needed.

Accordingly, there is an opportunity for a multi-channel wireless audio receiver system that addresses these concerns. More particularly, there is an opportunity for a multi-channel diversity wireless audio transceiver system that provides flexibility in the operational channel count, bandwidth, and number of antennas in use, to provide operational modes that optimize the channel count and system performance.

SUMMARY

The invention is intended to solve the above-noted problems by providing a scalable wide band multi-branch diversity communication system to, among other things, enable operation in various modes that include diversity (e.g., one, two, or more (M) antenna diversity) and multi-transceiver diversity (e.g., two, three, four or more (2M) antenna diversity), wherein an operational bandwidth of the system can include portions that are covered by either diversity or multi-transceiver diversity.

An example wireless communication system includes a first wireless transceiver, having a first bandwidth and a first center frequency, a second transceiver, having a second bandwidth and a second center frequency, and a processor. The processor is configured to operate the wireless communication system in a first mode when a difference between the first center frequency and the second center frequency is greater than or equal to half of the first bandwidth plus the second bandwidth. And the processor is also configured to operate the wireless communication system in a second mode when a difference between the first center frequency and the second center frequency is less than half of the first bandwidth plus the second bandwidth.

In a second example, a method of operating a wireless communication system includes determining a first bandwidth and a first center frequency of a first transceiver of the wireless communication system. The method also includes determining a second bandwidth and a second center frequency of a second transceiver of the wireless communication system. The method further includes operating the wireless communication system in a first mode when a difference between the first center frequency and the second center frequency is greater than or equal to half of the first bandwidth plus the second bandwidth. And the method still further includes operating the wireless communication system in a second mode when a difference between the first center frequency and the second center frequency is less than half of the first bandwidth plus the second bandwidth.

In a third example, a non-transitory, computer-readable medium, has instructions stored thereon that, when executed by a processor, cause the performance of a set of acts. The set of acts includes determining a first bandwidth and a first center frequency of a first transceiver of a wireless communication system. The set of acts also includes determining a second bandwidth and a second center frequency of a second transceiver of the wireless communication system. The set of acts further includes operating the wireless communication system in a first mode when a difference between the first center frequency and the second center frequency is greater than or equal to half of the first bandwidth plus the second bandwidth. And the set of acts still further includes operating the wireless communication system in a second mode when a difference between the first center frequency and the second center frequency is less than half of the first bandwidth plus the second bandwidth.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

As noted above, embodiments of the present disclosure provide a scalable wideband multi-branch diversity communication system. For the purpose of explanation, various embodiments may be described herein with reference to an audio receiver system. However, it should be appreciated that the same principles and functions can also be applied to a transmitter system, and to communication systems that are not specifically "audio" systems (i.e., communication of data other than audio data).

Figure 1:
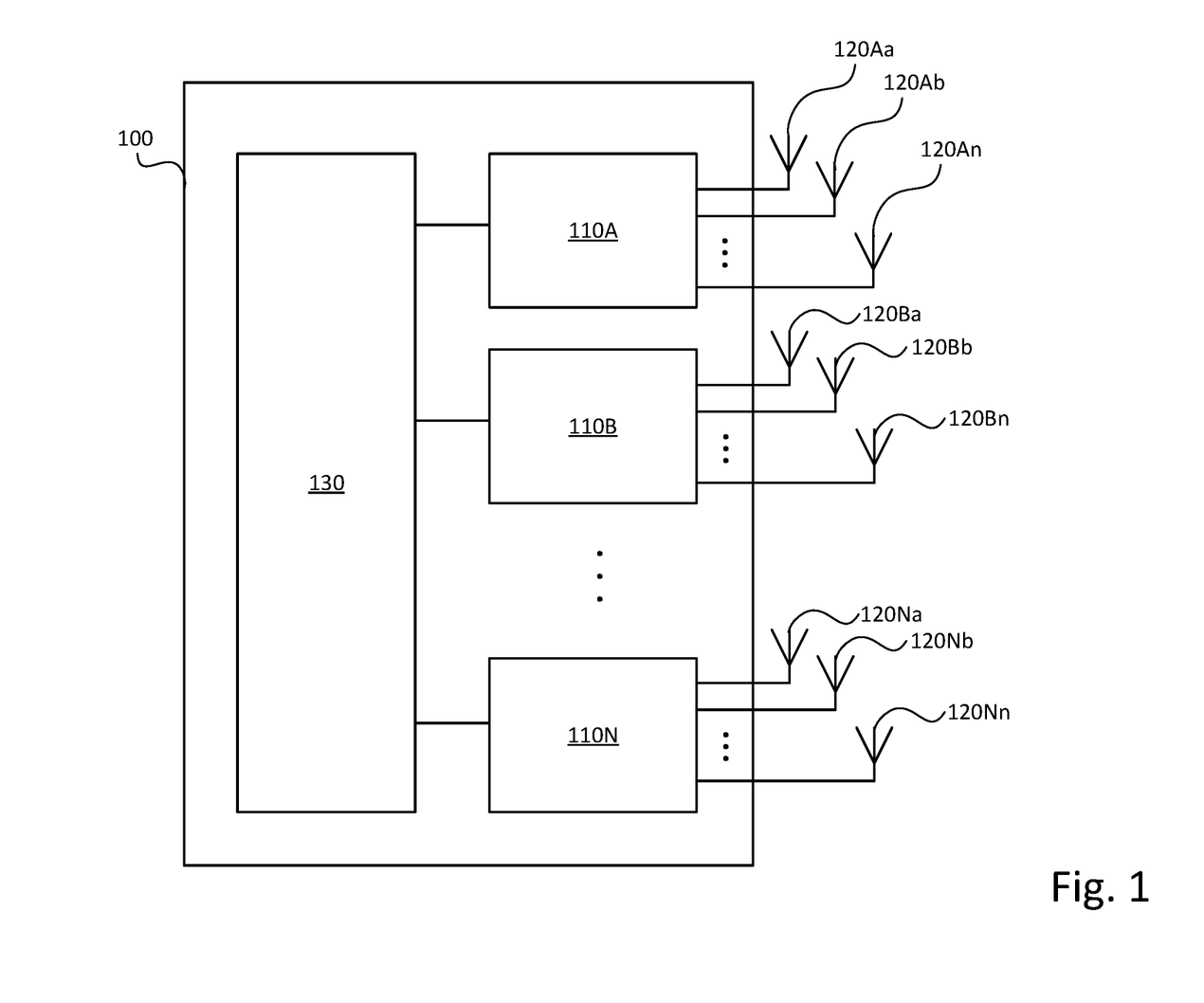
FIG. 1 is a simplified block diagram of a wireless communication system, in accordance with some embodiments of the present disclosure.

FIG. 1 illustrates a simplified block diagram of an example wireless communication system 100 according to embodiments of the present disclosure. The wireless communication system 100 may include a plurality of wireless transceivers 110A-110N, and a processor 130. Each transceiver 110A-N can include one or more ports (not labeled) that enable the transceiver to be electrically connected to one or more corresponding antennas (i.e., 1 to M antennas). The transceivers 110A-N are thus able to receive and/or transmit various signals. Transceiver 110A, for example, is electrically connected to antennas 120Aa-120An. Similarly, transceiver 110B is electrically connected to antennas 120Ba-120Bn, and transceiver 110N is electrically connected to antennas 120Na-120Nn.

Transceivers 110A-N can transmit and/or receive data, particularly audio data. Radio frequency (RF) signals may be received via the one or more antennas from a wireless audio transmitter and/or a microphone, for example, that has captured the sound of a production or other audio source. Each transceiver may operate a single channel, or may operate multiple channels simultaneously. As such, each transceiver, alone and in combination with other transceivers, can operate using either or both frequency diversity and antenna diversity.

Each transceiver 110A-N is configured to operate independently from each other transceiver, in some examples. Each transceiver may have a corresponding center frequency and a bandwidth, which may be independently tunable from all other transceivers. Each transceiver is also configured to operate in a diversity configuration.

Diversity operation can include a transceiver making use of one or more antennas receiving a signal from the same source. As a particular example, antenna diversity making use of two or more antennas is especially effective at mitigating multipath situations in which interference is introduced into a signal via differences in signal propagation as a signal travels from a source to the antenna. Each antenna will experience a different interference environment. Thus, if one antenna is experiencing a deep fade, another antenna may have a sufficient signal. The dual antenna configuration thus provides additional robustness, improving the signal quality and allowing for more robust communication without dropouts or signal loss. Antenna diversity can include using physically separated antennas (i.e., antennas positioned apart in space) in order to receive the same source signal at two different locations. Examples disclosed herein are described with respect to two antenna diversity, however it should be appreciated that "diversity" operation can include the use of one, three, or more antennas (i.e., M antennas) as well.

In some examples, the communication system 100 may operate two or more of the transceivers 110A-N as a "multi-transceiver diversity" receiver for a particular bandwidth of the frequency spectrum. Multi-transceiver diversity includes the use of both transceivers, such that if the transceivers individually operate as two antenna diversity receivers, they will operate as a four antenna "multi-transceiver diversity" transceiver for a particular bandwidth. The use of four antennas rather than two provides added robustness, which can be particularly useful in environments with a lot of interference. It should be appreciated that multi-transceiver diversity may refer to the use of two or more antennas (i.e., 2 to M antennas). The examples disclosed herein may refer specifically to multi-transceiver diversity as including the use of four antennas, however two, three, five, or more antennas may be used as well.

Some examples described herein may include a particular transceiver operating in both a diversity mode and in a multi-transceiver diversity mode. Specifically, a given transceiver may operate as an independent diversity receiver covering a first subset of the bandwidth covered by the transceiver, and may simultaneously operate as a multi-transceiver diversity transceiver (in connection with a second transceiver) covering a second subset of the bandwidth covered by the transceiver. This is described in more detail with respect to FIGS. 2A-C and 3A-C.

The processor 130 may be a signal processor configured to control and process signals received by and transmitted by the transceivers 110A. As such, the processor 130 may include a general purpose processor (e.g., a microprocessor) and/or a special purpose processor (e.g., a digital signal processor (DSP)). The processor 130 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The communication system 100 may also include a memory (not shown) which may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory includes multiple kinds of memory, particularly volatile memory and non-volatile memory.

The memory may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory, the computer readable medium, and/or within the processor 130 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Figure 2A:
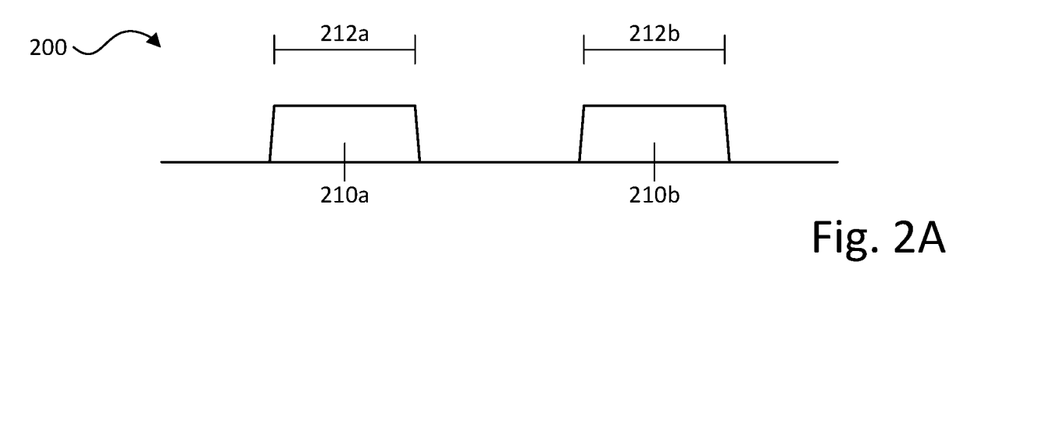
FIGS. 2A-C are simplified frequency spectrum diagrams of various modes of the wireless communication system of FIG. 1, in accordance with some embodiments of the present disclosure.
Figure 2B:
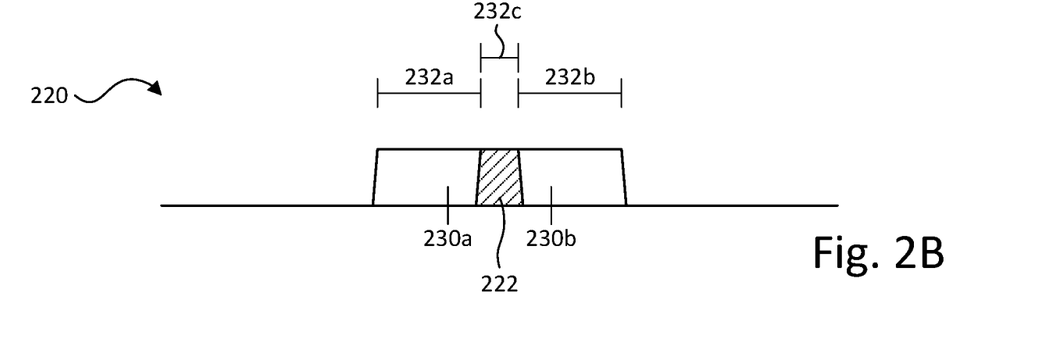
Figure 2C:
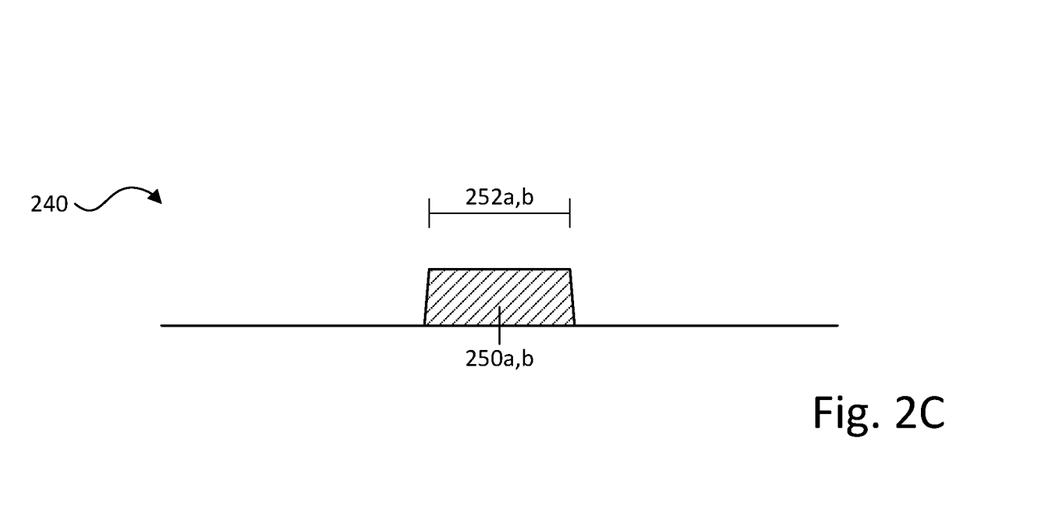

FIGS. 2A-C illustrate example frequency spectrum diagrams 200, 220, and 240 according to embodiments of the present disclosure. In particular, FIG. 2A illustrates operation of the communication system in a first mode, FIG. 2B illustrates operation of the communication system in a second mode, and FIG. 2C illustrates operation of the communication system in a third mode. These modes are described in further detail below.

The processor 130 may be configured to control the communication system 100 to operate in one or more modes. This can include controlling one or more of the transceivers 110A-N to operate in diversity mode, multi-transceiver diversity mode, and/or a combination of both diversity and multi-transceiver diversity modes.

In a first embodiment, illustrated best in FIGS. 2A-C, the wireless communication system 100 includes two transceivers. This embodiment will be described with respect to the two transceivers receiving signals, however, it should be appreciated that the same principles also apply to a situation in which the transceivers act to transmit signals instead. Each transceiver has a corresponding center frequency and bandwidth. The processor 130 is configured to determine the center frequency and a bandwidth of the first transceiver, and to determine a second center frequency and a second bandwidth of the second transceiver.

The processor 130 is configured to operate the communication system 100 in a first mode when there is no overlap between the first transceiver and the second transceiver (e.g., the bandwidths covered by the first and second transceivers do not overlap). This can be determined based on the known center frequencies and bandwidths of the first and second transceivers.

FIG. 2A illustrates a frequency diagram 200 in which there is no overlap in the bandwidths of the two transceivers. Specifically, FIG. 2A shows that the first transceiver has a first center frequency 210a, and the second transceiver has a second center frequency 210b. The first transceiver has a corresponding first bandwidth 212a, and the second transceiver has a corresponding second bandwidth 212b. FIG. 2A illustrates that the first and second bandwidths are the same, however, it should be appreciated that each transceiver may have a different bandwidth.

For arbitrary bandwidths and center frequencies, the processor 130 may be configured to operate the communication system 100 in a first mode when a difference between the first center frequency 210a and the second center frequency 210b is greater than or equal to a first threshold. In an embodiment, the first threshold may be, for example, half of the combined first bandwidth 212a and second bandwidth 212b. This is shown by equation 1 below, where Cf1 is the first center frequency, Cf2 is the second center frequency, Bw1 is the first bandwidth, and Bw2 is the second bandwidth:

$$|Cf1 - Cf2| \geq \frac{Bw1 + Bw2}{2} \quad \text{eq. 1}$$

Operation in the first mode may include (i) operating the first transceiver as a first diversity transceiver, and (ii) operating the second transceiver as a second diversity transceiver. Each transceiver operates with a corresponding operational bandwidth, such that the total bandwidth of the communication system is the first bandwidth 212a plus the second bandwidth 212b. Further, each transceiver operates as an independent diversity transceiver, operating using antenna diversity.

The processor 130 is also configured to operate the communication system 100 in a second mode when there is at least partial overlap between the first transceiver and the second transceiver (e.g., the bandwidths covered by the first and second transceivers overlap at least partially). This can be determined based on the known center frequencies and bandwidths of the first and second transceivers.

FIG. 2B illustrates a frequency diagram 220 in which there is overlap in the bandwidths of the two transceivers. This is shown as the shaded portion 222. Specifically, FIG. 2B shows that the first transceiver has a first center frequency 230a, and the second transceiver has a second center frequency 230b. The first transceiver has a corresponding first bandwidth that comprises the combination of 232a and 232c, and the second transceiver has a corresponding second bandwidth that comprises the combination of 232b and 232c. The bandwidth portion 232c is the bandwidth of the portion 222 that overlaps between the first transceiver and the second transceiver. Similar to FIG. 2A, FIG. 2B illustrates that the bandwidths of the first and second transceivers are the same, however, it should be appreciated that each transceiver may have a different bandwidth.

For arbitrary bandwidths and center frequencies, the processor 130 may be configured to operate the communication system 100 in the second mode when a difference between the first center frequency 210a and the second center frequency 210b is less than the first threshold. In an embodiment, the first threshold may be, for example, half of the combined first bandwidth 212a and second bandwidth 212b. This is shown by equation 2 below, where Cf1 is the first center frequency, Cf2 is the second center frequency, Bw1 is the first bandwidth, and Bw2 is the second bandwidth:

$$|Cf1 - Cf2| < \frac{Bw1 + Bw2}{2} \quad \text{eq. 2}$$

Operation in the second mode may include (i) operating the first transceiver and the second transceiver as a combined multi-transceiver diversity receiver having a first operational bandwidth comprising a first portion of the first bandwidth that overlaps with a first portion of the second bandwidth (e.g., bandwidth portion 232c), (ii) operating first transceiver as a diversity transceiver having a second operational bandwidth comprising a second portion of the first bandwidth that does not overlap with the second bandwidth (e.g., bandwidth portion 232a), and (iii) operating the second transceiver as a diversity transceiver having a third operational bandwidth comprising a second portion of the second bandwidth that does not overlap with the first bandwidth (e.g., bandwidth portion 232b). A total covered bandwidth of the communication system 100 when operating in the second mode comprises a combination of the first operational bandwidth 232c, the second operational bandwidth 232a, and the third operational bandwidth 232b. The communication system 100 when operating in the second mode includes multi-transceiver diversity coverage by both the first and second transceivers of the first operational bandwidth 232c, diversity coverage by the first transceiver of the second operational bandwidth 232a and diversity coverage by the second transceiver of the third operational bandwidth 232b.

FIG. 2B illustrates a specific scenario in which there is overlap between the bandwidths of the first and second transceivers, and that the first and second bandwidths are the same. Processor 130 may also be configured to operate the communication system 100 in the second mode when there is overlap between the first and second bandwidths, but the first and second bandwidths are not the same. For example, this can occur when the first bandwidth is larger than and fully includes the second bandwidth. In this case, the first bandwidth may extend on one or both sides of the second bandwidth. Here, the communication system may operate the first and second transceivers as a multi-transceiver diversity transceiver covering the entirety of the second bandwidth (that is fully covered by the first bandwidth), and simultaneously operate the first transceiver as a diversity transceiver for the portion of the first bandwidth that is not covered by the second bandwidth. The second transceiver in this can may only act as a multi-transceiver diversity receiver in combination with the first transceiver, because there is no portion of the second bandwidth that is not covered by the first bandwidth.

The processor 130 is configured to operate the communication system 100 in a third mode under particular circumstances when there is a complete overlap between the first transceiver and the second transceiver (e.g., the bandwidths covered by the first and second transceivers are the same, and the center frequencies are the same). This can be determined based on the known center frequencies and bandwidths of the first and second transceivers.

FIG. 2C illustrates a frequency diagram 240 in which there is complete overlap in the bandwidths of the two transceivers. Specifically, FIG. 2C shows that the first transceiver has a first center frequency 250a, and the second transceiver has a second center frequency 250b that is the same. The first transceiver has a corresponding first bandwidth 252a, and the second transceiver has a corresponding second bandwidth 252b that is the same.

Operation in the third mode may include operating the first transceiver and the second transceiver as a combined multi-transceiver diversity transceiver, wherein an operational bandwidth of the combined multi-transceiver diversity transceiver comprises the first bandwidth or the second bandwidth (since they are the same).

Figure 3A:
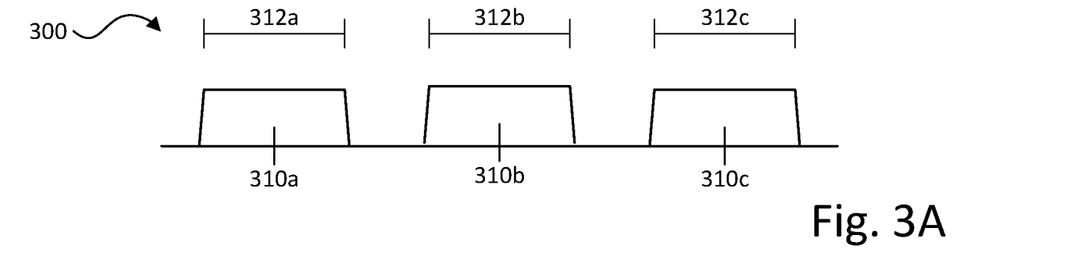
FIGS. 3A-C are simplified frequency spectrum diagrams of various modes of the wireless communication system of FIG. 1, in accordance with some embodiments of the present disclosure.
Figure 3B:
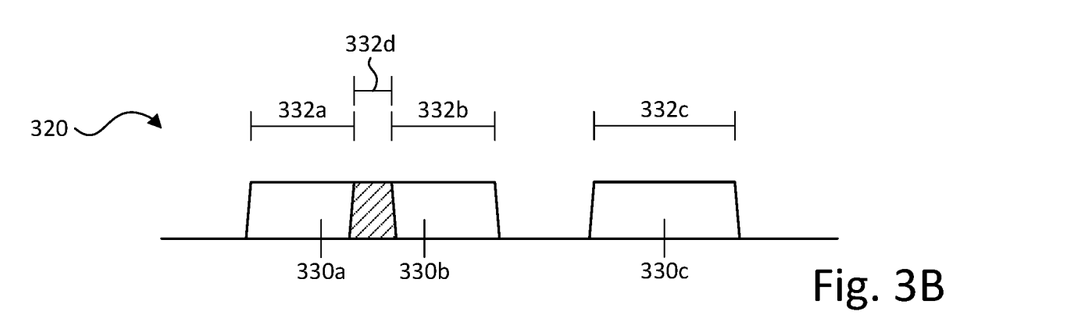
Figure 3C:
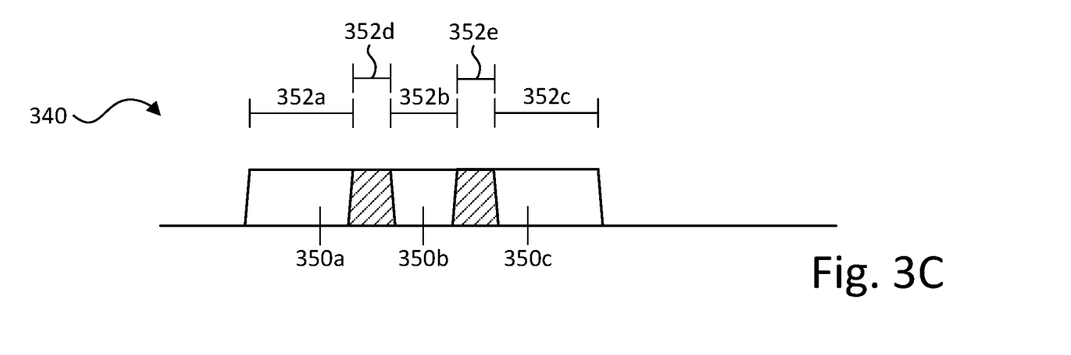

In a second embodiment, illustrated best in FIGS. 3A-C, the wireless communication system 100 includes three transceivers. This embodiment will be described with respect to the three transceivers receiving signals, however, it should be appreciated that the same principles also apply to a situation in which the transceivers act to transmit signals instead. Each transceiver has a corresponding center frequency and bandwidth. The processor 130 is configured to determine the center frequency and a bandwidth of the first transceiver, the second transceiver, and the third transceiver.

The processor 130 is configured to operate the communication system 100 in a fourth mode when there is no overlap between the first transceiver and the second transceiver, between the second transceiver and the third transceiver, and between the first transceiver and the third transceiver (e.g., the bandwidths covered by the first, second, and third transceivers do not overlap). This can be determined based on the known center frequencies and bandwidths of the first, second, and third transceivers.

FIG. 3A illustrates a frequency diagram 300 in which there is no overlap in the bandwidths of the three transceivers. Specifically, FIG. 3A shows that the first transceiver has a first center frequency 310a, the second transceiver has a second center frequency 310b, and the third transceiver has a third center frequency 310c. The first transceiver has a corresponding first bandwidth 312a, the second transceiver has a corresponding second bandwidth 312b, and the third transceiver has a corresponding third bandwidth 312c. FIG. 3A illustrates that the first, second, and third bandwidths are the same, however, it should be appreciated that each transceiver may have a different bandwidth.

For arbitrary bandwidths and center frequencies, the processor 130 may be configured to operate the communication system 100 in a fourth mode when there is no overlap between any of the bandwidths of the three transceivers. This is the case when each of the following equations is true, wherein Cf1 is the first center frequency, Cf2 is the second center frequency, Cf3 is the third center frequency, Bw1 is the first bandwidth, Bw2 is the second bandwidth, and Bw3 is the third bandwidth:

$$|Cf1 - Cf2| \geq \frac{Bw1 + Bw2}{2} \quad \text{eq. 3}$$

$$|Cf2 - Cf3| \geq \frac{Bw2 + Bw3}{2} \quad \text{eq. 4}$$

$$|Cf1 - Cf3| \geq \frac{Bw1 + Bw3}{2} \quad \text{eq. 5}$$

Operation in the fourth mode may include (i) operating the first transceiver as a first diversity transceiver covering the first bandwidth, (ii) operating the second transceiver as a second diversity transceiver covering the second bandwidth, and (iii) operating the third transceiver as a third diversity transceiver covering the third bandwidth. The total bandwidth of the communication system 100 is the first bandwidth plus the second bandwidth plus the third bandwidth. Further, each transceiver operates as an independent diversity transceiver, operating using antenna diversity.

The processor 130 is configured to operate the communication system 100 in a fifth mode when there is at least partial overlap between the first transceiver and the second transceiver, between the second transceiver and the third transceiver, or between the first transceiver and the third transceiver (e.g., there is some overlap between one or more pairs of the bandwidths covered by the first, second, and third transceivers). This can be determined based on the known center frequencies and bandwidths of the first, second, and third transceivers.

FIGS. 3B and 3C illustrate respective frequency diagrams 320 and 340 in which there is overlap in at least one pair of the bandwidths of the three transceivers. Specifically, FIG. 3B illustrates an overlap between the bandwidths of the first transceiver and the second transceiver, and FIG. 3C illustrates overlaps between the bandwidths of the first and second transceivers, and between the second and third transceivers. FIGS. 3B and 3C illustrate two possible examples for which the bandwidths overlap. However, it should be appreciated that many other variations in overlapping bandwidths can be used, and that the examples shown in the FIGS. are for example only.

FIG. 3B shows that the first transceiver has a first center frequency 330a, the second transceiver has a second center frequency 330b, and the third transceiver has a third center frequency 330c. The first transceiver has a corresponding first bandwidth that is a combination of portion 332a and 332d, the second transceiver has a corresponding second bandwidth that is a combination of portion 332b and portion 332d, and the third transceiver has a corresponding third bandwidth 332c. FIG. 3B illustrates that the first, second, and third bandwidths are the same, however, it should be appreciated that each transceiver may have a different bandwidth.

For arbitrary bandwidths and center frequencies, the processor 130 may be configured to operate the communication system 100 in a fifth mode when there is at least partial overlap between any of the bandwidths of the three transceivers. This is the case when any one or more of the following equations is true, wherein Cf1 is the first center frequency, Cf2 is the second center frequency, Cf3 is the third center frequency, Bw1 is the first bandwidth, Bw2 is the second bandwidth, and Bw3 is the third bandwidth:

$$|Cf1 - Cf2| < \frac{Bw1 + Bw2}{2} \quad \text{eq. 6}$$

$$|Cf2 - Cf3| < \frac{Bw2 + Bw3}{2} \quad \text{eq. 7}$$

$$|Cf1 - Cf3| < \frac{Bw1 + Bw3}{2} \quad \text{eq. 8}$$

Equation 6 is true in FIG. 3B. Operation in the fifth mode with respect to the scenario laid out in FIG. 3B may include (i) operating the first transceiver and the second transceiver as a combined multi-transceiver diversity transceiver having a first operational bandwidth comprising a first portion of the first bandwidth that overlaps with a first portion of the second bandwidth (i.e., bandwidth portion 332d), (ii) simultaneously operating the first transceiver as a first diversity transceiver covering a second portion of the first bandwidth that does not overlap with the second bandwidth (i.e., bandwidth portion 332a), (iii) operating the second transceiver as a second diversity transceiver covering a second portion of the second bandwidth that does not overlap with the first bandwidth (i.e., bandwidth portion 332b), and (iv) operating the third transceiver as a third diversity transceiver covering the third bandwidth (i.e., bandwidth 332c). Thus for the scenario of FIG. 3B, the total bandwidth and diversity/multi-transceiver diversity coverage by the communication system 100 thus includes multi-transceiver diversity coverage by both the first and second transceivers of the first operational bandwidth 332d, diversity coverage by the first transceiver of the second portion of the first bandwidth 332a, diversity coverage by the second transceiver of the second portion of the second bandwidth 332b, and diversity coverage of the third operational bandwidth 332c.

Equations 6 and 7 are true in FIG. 3C. FIG. 3C shows that the first transceiver has a first center frequency 350a, the second transceiver has a second center frequency 350b, and the third transceiver has a third center frequency 350c. Operation in the fifth mode with respect to the scenario laid out in FIG. 3C may include (i) operating the first transceiver and the second transceiver as a combined multi-transceiver diversity transceiver having a first operational bandwidth comprising a first portion of the first bandwidth that overlaps with a first portion of the second bandwidth (i.e., bandwidth portion 352d), (ii) operating the second transceiver and the third transceiver as a combined multi-transceiver diversity transceiver having a second operational bandwidth comprising a second portion of the second bandwidth that overlaps with a first portion of the third bandwidth (i.e., bandwidth portion 352e), (iii) operating the first transceiver as a first diversity transceiver covering a second portion of the first bandwidth that does not overlap with the second bandwidth (i.e., bandwidth portion 352a), (iv) operating the second transceiver as a second diversity transceiver covering a third portion of the second bandwidth that does not overlap with the first bandwidth or the third bandwidth (i.e., bandwidth portion 352b), and (v) operating the third transceiver as a third diversity transceiver covering a second portion of the third bandwidth that does not overlap with the second bandwidth (i.e., bandwidth portion 352c). Thus for the scenario of FIG. 3C, the total bandwidth and diversity/multi-transceiver diversity coverage by the communication system 100 thus includes multi-transceiver diversity coverage by both the first and second transceivers of the first operational bandwidth 352d, multi-transceiver diversity coverage by both the second and third transceivers of the second operational bandwidth 352e, diversity coverage by the first transceiver of the second portion of the first bandwidth 352a, diversity coverage by the second transceiver of the third portion of the second bandwidth 352b, and diversity coverage of the second portion of the third bandwidth 352c.

While not explicitly shown in the Figures, it should be appreciated that any combination of transceivers may have overlapping bandwidths, and thus any combination of transceivers may act as a multi-transceiver diversity transceiver. The use of two or more transceivers acting as a multi-transceiver diversity transceiver enables better signal to noise ratio, and thus more robust communication, but at the expense of reduced channel count. Thus, the communication system of the present disclosure enables a best of both worlds scenario, wherein if more channels are needed the system can provide that, but if fewer channels are needed or more robust communication is required, the system can provide that functionality as well.

Figure 4:
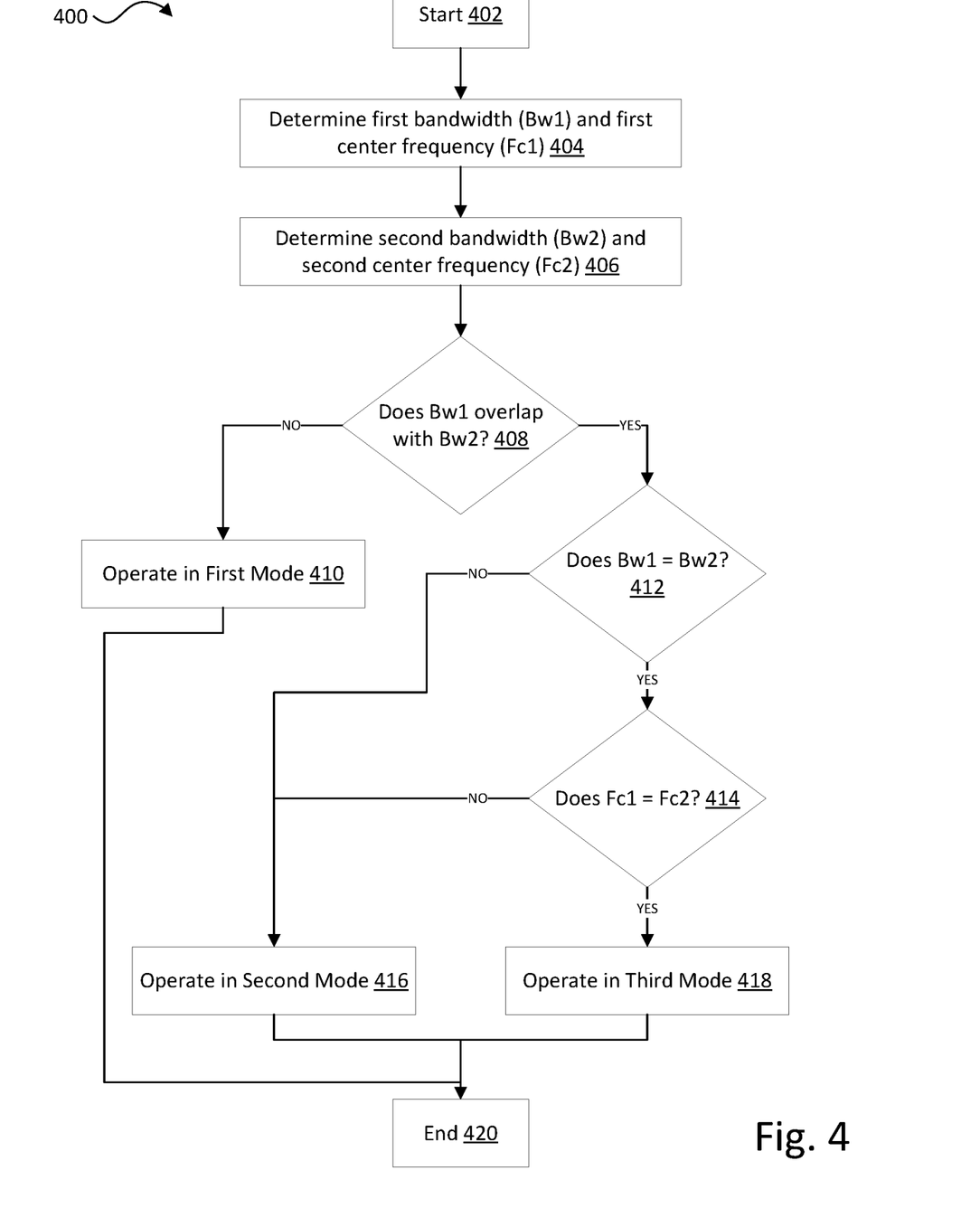
FIG. 4 is a flowchart illustrating an example method of operating the wireless communication system of FIG. 1, in accordance with some embodiments of the present disclosure.

FIG. 4 illustrates a flowchart of an example method 400 according to embodiments of the present disclosure. Method 400 may enable scalable diversity deployment for a wide tuning range receiver, by enabling both diversity operation and multi-transceiver diversity operation. The flowchart of FIG. 4 is representative of machine readable instructions that are stored in memory and may include one or more programs which, when executed by a processor (such as processor 130) may cause one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 starts at block 402. At block 404, method 400 may include determining a first bandwidth and a first center frequency of a first transceiver. At block 406 method 400 may include determining a second bandwidth and a second center frequency of a second transceiver. Method 400 is illustrated in FIG. 4 as including operation of only two transceivers. However, it should be appreciated that the method and concepts disclosed herein may still function when three or more transceivers are used.

At block 408, method 400 may include determining whether the first bandwidth overlaps with the second bandwidth. This can be done as noted above with respect to equations 1-8, based on a determination whether a difference between the first center frequency and the second center frequency is less than half of the combined first bandwidth and second bandwidth.

If there is no overlap, method 400 may include operating the communication system in a first mode at block 410. The first mode is described in further detail above with respect to FIG. 2A.

If there is overlap between the first bandwidth and the second bandwidth, block 412 of method 400 may include determining whether the first and second bandwidths are the same. If the first and second bandwidth are not the same, it is not possible for there to be complete overlap between the first and second bandwidths. In this case, method 400 may include operating the communication system in a second mode at block 416. The second mode is described in further detail above with respect to FIG. 2B.

If the bandwidths are determined to be the same at block 412, block 414 of method 400 may include determining whether the first center frequency is the same as the second center frequency. If the first and second center frequencies are the same, and the first and second bandwidths are the same, then there is complete overlap between the first transceiver and the second transceiver. In this case, method 400 may include operating the communication system in a third mode at block 418. The third mode is described in further detail above with respect to FIG. 2C.

However, if the first and second bandwidths are the same, but the first and second center frequencies are not the same, there will be partial but not complete overlap between the first and second bandwidths. In this case, method 400 may include operating the communication system in the second mode at block 416. Method 400 may then end at block 420.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A wireless communication system, comprising:
a first receiver having a first bandwidth;
a second receiver having a second bandwidth; and
a processor configured to: based on the first bandwidth and the second bandwidth at least partially overlapping, operate the wireless communication system by configuring each of the first and second receivers to operate as a diversity receiver for a first portion of an operational bandwidth of the wireless communication system and as a combined multi-receiver diversity receiver for a second portion of the operational bandwidth.

2. The wireless communication system of claim 1, wherein the processor is configured to operate the wireless communication system by configuring the first receiver and the second receiver to operate as the combined multi-receiver diversity receiver having a first operational bandwidth comprising a first portion of the first bandwidth that overlaps with a first portion of the second bandwidth.

3. The wireless communication system of claim 2, wherein the processor is further configured to operate the wireless communication system by:
configuring the first receiver to operate as a diversity receiver having a second operational bandwidth comprising a second portion of the first bandwidth that does not overlap with the second bandwidth; and
configuring the second receiver to operate as a diversity receiver having a third operational bandwidth comprising a second portion of the second bandwidth that does not overlap with the first bandwidth.

4. The wireless communication system of claim 1, wherein the first receiver has a first center frequency and the second receiver has a second center frequency;
wherein the processor is further configured to operate the wireless communication system in one of a diversity mode or a hybrid diversity mode based on a difference between the first center frequency and the second center frequency; and
wherein the hybrid diversity mode comprises based on the first bandwidth and the second bandwidth at least partially overlapping, operating the wireless communication system by configuring each of the first and second receivers to operate as the diversity receiver for the first portion of the operational bandwidth of the wireless communication system and as the combined multi-receiver diversity receiver for the second portion of the operational bandwidth.

5. The wireless communication system of claim 4, wherein the processor is configured to:
operate the wireless communication system in the diversity mode when the difference between the first center frequency and the second center frequency is greater than or equal to a threshold; and
operate the wireless communication system in the hybrid diversity mode when the difference between the first center frequency and the second center frequency is less than the threshold.

6. The wireless communication system of claim 1, wherein the first bandwidth and the second bandwidth are the same, and wherein the processor is further configured to operate the wireless communication system by configuring each of the first and second receivers to operate as the combined multi-receiver diversity receiver when a first center frequency of the first receiver and a second center frequency of the second receiver are the same.

7. A method of operating a wireless communication system, comprising:
determining a first bandwidth of a first receiver of the wireless communication system;
determining a second bandwidth of a second receiver of the wireless communication system; and
based on the first bandwidth and the second bandwidth at least partially overlapping, operating the wireless communication system by operating each of the first and second receivers as a diversity receiver for a first portion of an operational bandwidth of the wireless communication system and as a combined multi-receiver diversity receiver for a second portion of the operational bandwidth.

8. The method of claim 7, wherein operating the wireless communication system comprises operating the first receiver and the second receiver as the combined multi-receiver diversity receiver having a first operational bandwidth comprising a first portion of the first bandwidth that overlaps with a first portion of the second bandwidth.

9. The method of claim 8, wherein operating the wireless communication system further comprises:
operating the first receiver as a diversity receiver having a second operational bandwidth comprising a second portion of the first bandwidth that does not overlap with the second bandwidth; and
operating the second receiver as a diversity receiver having a third operational bandwidth comprising a second portion of the second bandwidth that does not overlap with the first bandwidth.

10. The method of claim 7, further comprising:
determining a first center frequency of the first receiver and a second center frequency of the second receiver; and
operating the wireless communication system in one of a diversity mode or a hybrid diversity mode based on a difference between the first center frequency and the second center frequency;
wherein the hybrid diversity mode comprises based on the first bandwidth and the second bandwidth at least partially overlapping, operating the wireless communication system by operating each of the first and second receivers as the diversity receiver for the first portion of the operational bandwidth of the wireless communication system and as the combined multi-receiver diversity receiver for the second portion of the operational bandwidth.

11. The method of claim 10, wherein operating the wireless communication system comprises:
operating the wireless communication system in the diversity mode when the difference between the first center frequency and the second center frequency is greater than or equal to a threshold; and
operating the wireless communication system in the hybrid diversity mode when the difference between the first center frequency and the second center frequency is less than the threshold.

12. The method of claim 7, wherein the first bandwidth and the second bandwidth are the same, and wherein the method further comprises operating the first and second receivers as the combined multi-receiver diversity receiver when a first center frequency of the first receiver and a second center frequency of the second receiver are the same.

13. A wireless communication system, comprising:
a first transmitter having a first bandwidth;
a second transmitter having a second bandwidth; and
a processor configured to: based on the first bandwidth and the second bandwidth at least partially overlapping, operate the wireless communication system by configuring each of the first and second transmitters to operate as a diversity transmitter for a first portion of an operational bandwidth of the wireless communication system and as a combined multi-transmitter diversity transmitter for a second portion of the operational bandwidth.

14. The wireless communication system of claim 13, wherein the processor is configured to operate the wireless communication system by configuring the first transmitter and the second transmitter to operate as the combined multi-transmitter diversity transmitter having a first operational bandwidth comprising a first portion of the first bandwidth that overlaps with a first portion of the second bandwidth.

15. The wireless communication system of claim 14, wherein the processor is further configured to operate the wireless communication system by:
configuring the first transmitter to operate as a diversity transmitter having a second operational bandwidth comprising a second portion of the first bandwidth that does not overlap with the second bandwidth; and
configuring the second transmitter to operate as a diversity transmitter having a third operational bandwidth comprising a second portion of the second bandwidth that does not overlap with the first bandwidth.

16. The wireless communication system of claim 13,
wherein the first transmitter has a first center frequency and the second transmitter has a second center frequency;
wherein the processor is further configured to operate the wireless communication system in one of a diversity mode or a hybrid diversity mode based on a difference between the first center frequency and the second center frequency; and
wherein the hybrid diversity mode comprises based on the first bandwidth and the second bandwidth at least partially overlapping, operating the wireless communication system by configuring each of the first and second transmitters to operate as the diversity transmitter for the first portion of the operational bandwidth of the wireless communication system and as the combined multi-transmitter diversity transmitter for the second portion of the operational bandwidth.

17. A method of operating a wireless communication system, comprising:
determining a first bandwidth of a first transmitter of the wireless communication system;
determining a second bandwidth of a second transmitter of the wireless communication system; and
based on the first bandwidth and the second bandwidth at least partially overlapping, operating the wireless communication system by operating each of the first and second transmitters as a diversity transmitter for a first portion of an operational bandwidth of the wireless communication system and as a combined multi-transmitter diversity transmitter for a second portion of the operational bandwidth.

18. The method of claim 17, wherein operating the wireless communication system comprises operating the first transmitter and the second transmitter as the combined multi-transmitter diversity transmitter having a first operational bandwidth comprising a first portion of the first bandwidth that overlaps with a first portion of the second bandwidth.

19. The method of claim 18, wherein operating the wireless communication system further comprises:
operating the first transmitter as a diversity transmitter having a second operational bandwidth comprising a second portion of the first bandwidth that does not overlap with the second bandwidth; and
operating the second transmitter as a diversity transmitter having a third operational bandwidth comprising a second portion of the second bandwidth that does not overlap with the first bandwidth.

20. The method of claim 17, further comprising:
determining a first center frequency of the first transmitter and a second center frequency of the second transmitter; and
operating the wireless communication system in one of a diversity mode or a hybrid diversity mode based on a difference between the first center frequency and the second center frequency;
wherein the hybrid diversity mode comprises based on the first bandwidth and the second bandwidth at least partially overlapping, operating the wireless communication system by operating each of the first and second transmitters as the diversity transmitter for the first portion of the operational bandwidth of the wireless communication system and as the combined multi-transmitter diversity transmitter for the second portion of the operational bandwidth.

* * * * *